United States Patent
Lee et al.

(10) Patent No.: US 8,686,595 B2
(45) Date of Patent: Apr. 1, 2014

(54) TPMS TRANSMISSION MODULE HAVING POWER SAVING FUNCTION

(75) Inventors: Kyungno Lee, Seoul (KR); Kang Joo Kim, Gyunggi-do (KR); Jong Hyeong Song, Gyunggi-do (KR); Hae Seung Hyun, Gyunggi-do (KR); Seung Do An, Gyunggi-do (KR); Jong Woo Han, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 510 days.

(21) Appl. No.: 13/087,903

(22) Filed: Apr. 15, 2011

(65) Prior Publication Data
US 2012/0169142 A1 Jul. 5, 2012

(30) Foreign Application Priority Data
Jan. 4, 2011 (KR) .......................... 10-2011-0000532

(51) Int. Cl.
*H02J 1/00* (2006.01)

(52) U.S. Cl.
USPC .......................................................... 307/80

(58) Field of Classification Search
USPC ...................................................... 307/9.1, 80
See application file for complete search history.

(56) References Cited

U.S. PATENT DOCUMENTS 7,429,805 B2 * 9/2008 Hamel et al. ................... 307/9.1

* cited by examiner

*Primary Examiner* — Robert L. DeBeradinis
(74) *Attorney, Agent, or Firm* — Ladas & Parry, LLP

(57) ABSTRACT

Disclosed herein is a TPMS transmission module having a power saving function, the TPMS transmission module including: a micom outputting a switch turn-off control signal when a vehicle having the TPMS transmission module mounted therein is stopped; a switch supplying a power when the switch is turned on and blocking the supply of the power when it is turned off; an energy generator generating and outputting an electric power when a tire rotates; and a switch controller turning on the switch when the electric power of a predetermined voltage or more is generated in the energy generator and turning off the switch when a switch turn off control signal is output from the micom.

5 Claims, 3 Drawing Sheets

TPMS TRANSMISSION MODULE HAVING POWER SAVING FUNCTION

CROSS REFERENCE TO RELATED APPLICATION

This application claims the benefit of Korean Patent Application No. 10-2011-0000532, filed on Jan. 4, 2011, entitled "TPMS Transmission Module Having Power Saving Function", which is hereby incorporated by reference in its entirety into this application.

BACKGROUND OF THE INVENTION

1. Technical Field

The present invention relates to a TPMS transmission module having a power saving function.

2. Description of the Related Art

A tire pressure monitoring system (TPMS) measuring the pressure of a tire in order to prepare for a serious situation beforehand by checking a state of the tire that is directly related to the stability of a vehicle has been recently developed.

The TPMS senses pressure and temperature by a sensor attached to the tire and transmits data including the sensed pressure and temperature to the front of a driver seat in real time to thereby allow a driver to check a pressure state of the tire in real time.

The types of TPMS are divided into an indirect type and a direct type. In the indirect type TPMS, the state of the tire is sensed by sensing RPM of each wheel through an anti-lock brake system (ABS) sensor, and in the direct type TPMS, the pressure of the tire is sensed by a sensor embedded in the wheel.

Since the indirect type TPMS has low reliability, the direct type TPMS has been currently commercialized.

In the TPMS, a battery is integrally formed with a TPMS transmission module, such that it may not be replaced and is used until the end of its lifespan once it is mounted.

Therefore, there is a need to maximize the lifespan of the battery in order to reliably transmit data in the TPMS transmission module.

SUMMARY OF THE INVENTION

The present invention has been made in an effort to provide a TPMS transmission module having a power saving function in which when a vehicle is in a stop state, power of the TPMS transmission module is turned off to thereby minimize electric power usage.

According to a first preferred embodiment of the present invention, there is provided a TPMS transmission module having a power saving function, the TPMS transmission module including: a micom transmitting a sensed tire state, informing the outside that the micom is being operated when it is being operated, and outputting a switch turn-off control signal when a vehicle having the TPMS transmission module mounted therein is stopped; a switch supplying power of a power supply to the micom when the switch is turned on and blocking the supply of the power to the micom when it is turned off; an energy generator generating and outputting an electric power when a wheel of the vehicle rotates, the wheel having the energy generator mounted thereon; and a switch controller turning on the switch when the electric power of a predetermined voltage or more is generated in the energy generator, maintaining the switch in a turn-on state when the micom is being operated, and turning off the switch when a switch turn off control signal is output from the micom.

The switch may be a P-MOSFET having a source connected to the power supply, a drain connected to the micom, and a gate connected to the switch controller, and the switch controller may turn on the P-MOSFET by applying the electric power of a predetermined voltage or more to the gate thereof when the electric power of a predetermined voltage or more is generated in the energy generator, maintain the P-MOSFET in a turn-on state when the micom is being operated, and turn off the P-MOSFET by applying the electric power of a predetermined voltage or less to the gate thereof when the switch turn off control signal is output from the micom.

The energy generator may include: a housing; a loading mass; and a piezoelectric element having a first end fixed to the housing and a second end coupled to the loading mass, and the piezoelectric element and the loading mass coupled thereto may be influenced by gravity when the wheel is rotating to thereby generate the electric power.

The switch controller may include: a first resistor connected between the power supply and the switch; an N-MOSFET having a drain connected to the switch and a source connected to a ground; and a second resistor connected between a gate of the N-MOSFET and the micom in series, and the N-MOSFET may turn on the switch when the electric power of a predetermined voltage or more is applied from the energy generator thereto, maintain the switch in a turn-on state when the micom is being operated, such that the electric power of a predetermined voltage or more is applied from the micom to the gate thereof through the second resistor, and turn off the switch when the vehicle having the TPMS transmission module mounted therein is stopped, such that the electric power of a predetermined voltage or less is applied from the micom to the gate thereof through the second resistor.

The sensor module may include: a pressure sensor sensing pressure; and a temperature sensor sensing temperature.

DESCRIPTION OF THE PREFERRED EMBODIMENTS

Figure 1:
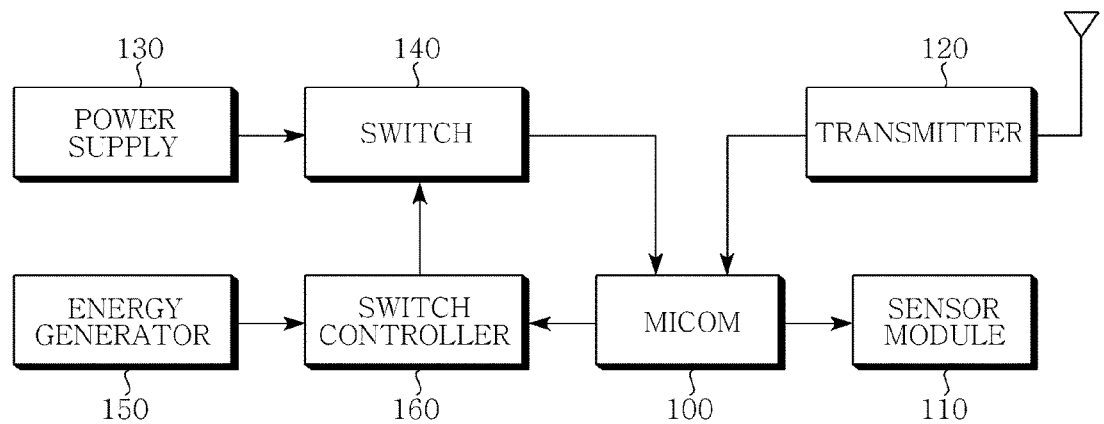
FIG. 1 is a view showing a configuration of a TPMS transmission module having a power saving function according to a first preferred embodiment of the present invention.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

FIG. 1 is a view showing a configuration of a TPMS transmission module having a power saving function according to a first preferred embodiment of the present invention.

Referring to FIG. 1, a TPMS transmission module having a power saving function according to a first preferred embodiment of the present invention is configured to include a microcomputer (micom) 100, a sensor module 110, a transmitter 120, a power supply 130, a switch 140, an energy generator 150, and a switch controller 160.

The micom 100 includes a central processing unit (CPU) core and peripheral devices such as a memory, a real time clock (RTC), an analog input port, a digital input/output port, etc., therein and controls the entire operation of the TPMS transmission module.

The micom 100 receives a signal regarding air pressure within a tire or a signal regarding air temperature within the tire from the sensor module 110 to transmit measured data at a predetermined time interval according to each driving mode, when power is supplied from the power supply 130 by a turn-on operation of the switch 140.

At this time, the micom 100 packetizes tire position information together with pressure data, temperature data, etc., into a predetermined data format and outputs the packetized data and information to the transmitter 120.

At the same time, the micom 100 informs the switch controller 160 that the switch is in a turn-on state (As described below, the micom 100 informs the switch controller 160 that the switch is in an on-state by, for example, setting a GPIO terminal to 1).

In addition, the micom 100 transmits a switch turn-off control signal to the switch controller 160 when a vehicle is stopped (As described below, the micom 100 informs the switch controller 160 of a command (switch turn-off control signal) to perform a control so as to turn off the switch by, for example, setting the GPIO terminal to 0).

Accordingly, when the switching controller 160 turns off the switch 140, such that power is not supplied from the power supply 130, the micom 100 stops its operation.

The sensor module 110 is configured of a pressure sensor sensing pressure, a temperature sensor sensing temperature, etc.

The pressure sensor configuring the sensor module 110 senses air pressure (P) within the tire to provide the sensed air pressure to the micom 100, and the temperature sensor configuring the sensor module 110 senses air temperature (Temp) within the tire to provide the sensed air temperature to the micom 100.

Appropriate air pressure (called an appropriate tire pressure) within the tire has a different reference value for each vehicle. In the case of a private car, it is generally about 28 to 32 psi (1 psi=0.0689 bar) In addition, the air temperature and the air pressure within the tire tends to increase due to rolling resistance to the ground, air friction, and the like, when the vehicle is driven, as compared to when it is parked.

Here, since the signals sensed by each sensor are analog signals, they may be converted into digital data through an analog-to-digital converter (ADC) and then be provided to the micom 100 or they may be transferred to an analog input port of the micom 100, be converted into digital data through an analog-to-digital converter (ADC) embedded in the micom 100, and then be processed by the micom 100. These sensors may also be compactly implemented using an application specific integrated chip (ASIC) semiconductor element.

The transmitter 120 transmits the packetized data and information output from the micom 100.

The transmitter 120 modifies the packetized digital bit stream into a radio frequency (RF) signal and transmits the modified RF signal through an antenna. As a scheme in which the transmitter 120 modifies the packetized digital bit stream into a radio frequency (RF) signal, various modification schemes may be used.

Meanwhile, the power supply 130 is configured of a battery, and supplies the power to the micom 100 when the switch 140 is turned on, and stops the supply of the power to the micom 100 when the switch 140 is turned off.

When the switch turn-on signal is input from the switch controller 160, the switch 140 is turned on, such that the power supplied from the power supply 130 is supplied to the micom 100, and when the switch turn-off signal is input from the switch controller 160, it is turned off, such that the power supplied from the power supply 130 is not supplied to the micom 100.

The energy generator 150 generates electric power having a predetermined voltage when the vehicle is driven and provides the generated electric power to the switch controller 160.

When the energy generator 150 generates the electric power of a predetermined voltage or more due to the driving of the vehicle, the switch controller 160 turns on the switch 140, such that the power supplied from the power supply 130 is supplied to the micom 100, and when the switch controller 160 is informed from the micom 100 that the micom 100 is being operated, it maintains the switch 140 in a turn-on state.

In addition, when the switch turn-off control signal is input from the micom 100, the switch controller 160 turns off the switch 140 to block the power supplied from the power supply 130, such that the power is not supplied to the micom 100.

An operation of the TPMS transmission module having a power saving function will be described.

When the driving of the vehicle having the TPMS transmission module mounted therein starts, the energy generator 150 generates the electric power having a predetermined voltage according to rotation of a wheel mounted in the vehicle and provides the generated electric power to the switch controller 160.

When the electric power having a predetermined voltage is input from the energy generator 150, the switch controller 160 turns on the switch 140, such that the power supplied from the power supply 130 is supplied to the micom 100. In addition, when the switch controller 160 is informed from the micom 100 that the micom 100 is being operated, it maintains the switch 140 in the turn-on state.

When the power is supplied from the power supply 130, the micom 100 starts its operation and transmits data measured by the sensor module 110 using the transmitter 120.

On the other hand, when the vehicle having the TPMS transmission module mounted therein is stopped, the micom 100 recognizes whether the voltage has been not generated in the energy generator 150, recognizes that the vehicle was stopped in the case in which the voltage is not generated, and transmits the switch turn-off control signal to the switch controller 160.

When the switch turn-off control signal is input from the micom 100, the switch controller 160 turns off the switch 140 to thereby block the power supplied from the power supply 130.

Figure 2A:
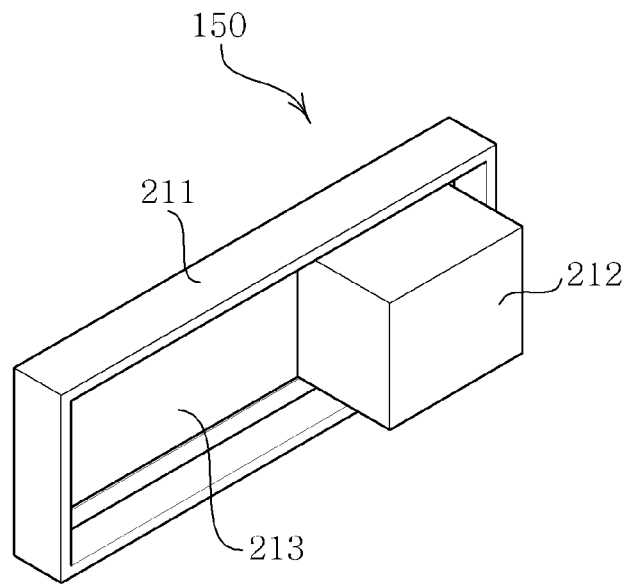
FIG. 2A is a perspective view of an energy generator of FIG. 1.
Figure 2B:
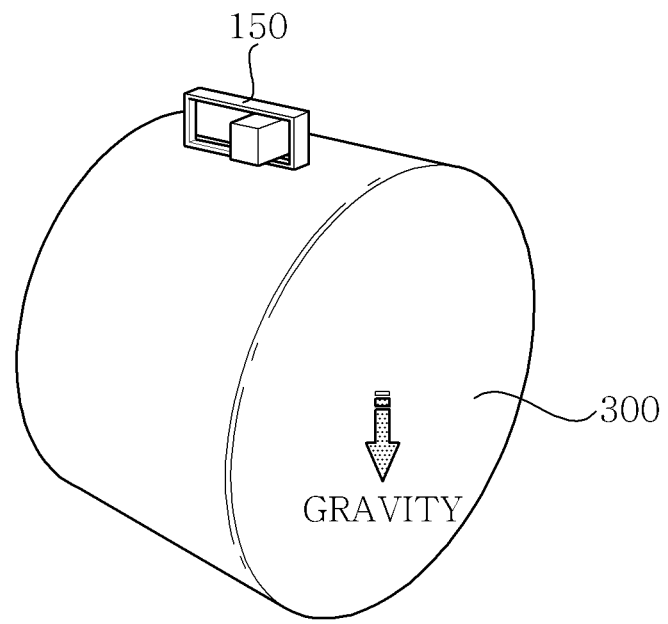
FIGS. 2B and 2C are perspective views of a wheel having the energy generator mounted thereon.
Figure 2C:
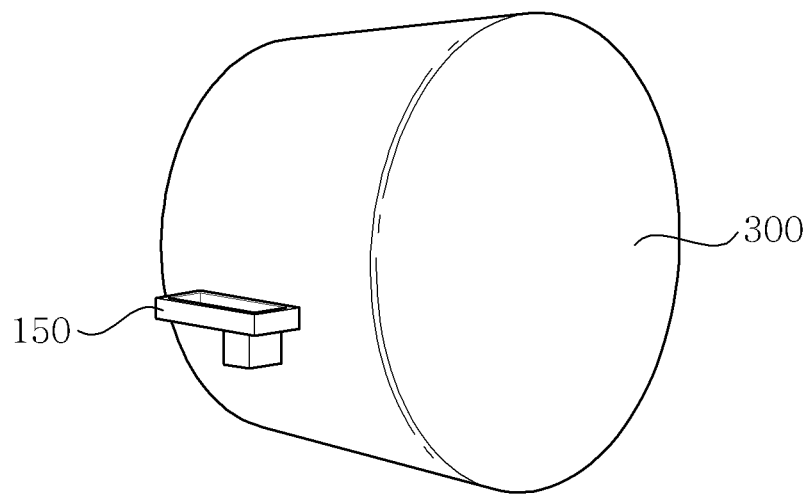

FIG. 2A is a perspective view of an energy generator of FIG. 1; and FIGS. 2B and 2C are perspective views of a wheel having the energy generator mounted thereon.

As shown in FIG. 2A, the energy generator of FIG. 1 includes a housing 211, a piezoelectric element, 213, and a loading mass 212 coupled to the piezoelectric element.

Referring to FIG. 2A, the piezoelectric element 213 is disposed in a cantilever shape in the housing 211. In other words, while a first end 215 of the piezoelectric element 213 is fixed to the housing 211, a second end 216 thereof is coupled to the loading mass 212.

The piezoelectric element 213 is preferably formed of a planar element. Alternatively, the piezoelectric element 213 may be formed of a lead element or a bar element. In a preferred embodiment of the present invention, the planar piezoelectric element includes two planar piezoelectric crystals separated by a planar electric conductor (for example, a metal) plate (bimorph shape). Electrodes are generally disposed on an outer surface of the piezoelectric element 213.

The energy generator is coupled to the tire so that the loading mass 212 is disposed along a surface substantially perpendicular to a radial direction of the wheel 300, that is, a direction extended from a rotational axis of the wheel 300, as shown in FIGS. 2B and 2C, which are perspective view of the wheel having the energy generator mounted thereon.

When the wheel 300 having the energy generator attached thereto rotates, a gravity direction is constant; however, a direction of force acting on the loading mass 212 of the energy generator is periodically changed. Therefore, the loading mass 212 is vibrated, such that the voltage is generated in the piezoelectric element 213.

In this way, the piezoelectric element 213 and the loading mass 212 coupled thereto are influenced by gravity when the wheel 300 is rotating. In order to uniformly divide stress applied to the piezoelectric element 213, a long side of the piezoelectric element 213 may preferably be substantially disposed in an axial direction of the wheel 300, that is, a direction parallel with the rotational axis of the wheel 300. Alternatively, the long side of the piezoelectric element may be disposed in a direction vertical to the wheel 300.

Geometric dimensions of the piezoelectric element 213, the loading mass 212, and the housing 211 are called a "gap" between an outer surface of the loading mass 212 and an inner wall of the housing 211, and are selected so that a space substantially defining maximum allowable deflection of the piezoelectric element 213 is formed.

In operation, the energy generator is influenced by the gravity when the wheel 300 is rotating.

More specifically, the energy generator is influenced by the gravity when complete rotation of the wheel 300 is being generated. When force is applied to the loading mass 212 by the gravity, the loading mass 212 is substantially perpendicular to the radial direction of the wheel, becomes distant from a first balance position, and faces the inner surface of the housing 211 at a degree determined by compliance of the piezoelectric element 213 and a size of the loading mass 212, wherein the maximum degree is determined by the space (gap). The piezoelectric element 213 is bent, corresponding to the movement of the loading mass 212. That is, the electric power is generated by a piezoelectric effect.

Figure 3:
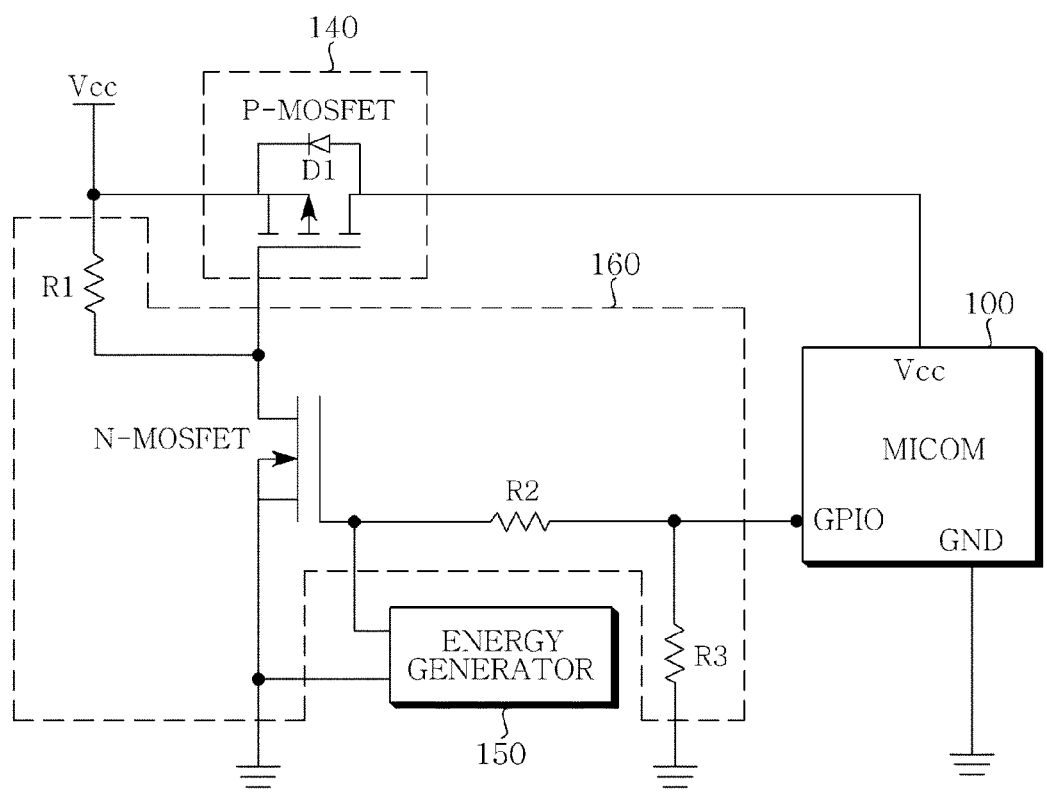
FIG. 3 is a detailed circuit diagram including a switch and a switch controller of FIG. 1.

FIG. 3 is a detailed circuit diagram including a switch and a switch controller of FIG. 1.

Referring to FIG. 3, the switch of FIG. 1 is configured of a P-MOSFET having a source connected to the power supply and a drain connected to the micom, and the source and the drain of the P-MOSFET has a reverse diode D1 connected therebetween.

In this configuration, when the P-MOSFET has a voltage of a threshold voltage or more applied from the switch controller to the gate thereof, it is turned on to thereby supply the power supplied from the power supply to the micom.

When the power is supplied from the power supply, the micom sets the GPIO terminal to 1 to thereby inform the switch controller that the micom is turned on and is being operated.

Meanwhile, the switch controller includes a first resistor R1 connected between the power supply and a gate of the P-MOSFET configuring the switch, an N-MOSFET having a drain connected to the gate of the P-MOSFET and a source connected to a ground, a second resistor R2 connected between a gate of the N-MOSFET and the GPIO terminal of the micom in series, and a third resistor R3 connected to the GPIO terminal of the micom and the ground. Here, the energy generator is connected between the gate and the source of the N-MOSFET.

In this configuration, when the micom is being operated, such that the GPIO terminal is set to 1 and the setting voltage of the GPIO terminal is applied to the gate of the N-MOSFET of the switch controller through the second resistor R2, the N-MOSFET of the switch controller is turned on to pass the power supplied from the power supply.

In this case, a current flows in the first resistor R1 connected between the power supply and the drain of the N-MOSFET to generate a voltage difference across the first resistor R1. The generated voltage difference is applied to the gate of the P-MOSFET to maintain the P-MOSFET in a turn-on state.

In this state, when the stop of the micom is sensed, such that the GPIO terminal is set to 0 (that is, the switch turn-off control signal is output), the voltage is not applied to the gate of the N-MOSFET, such that the N-MOSFET is turned off. Therefore, the current does not flow between the power supply and the drain of the N-MOSFET, such that the voltage is not generated at the first resistor (R1) and the P-MOSFET is turned off. As a result, the power no longer flows from the power supply to the micom, such that the micom is turned off.

Subsequently, when the vehicle is driven, such that the energy generator generates the electric power and the voltage of the generated electric power becomes the threshold voltage or more, the N-MOSFET is turned on to pass the power supplied from the power supply, such that the voltage difference is generated across the first resistor R1 connected between the power supply and the drain of the N-MOSFET, thereby turning on the P-MOSFET.

When the P-MOSFET is turned on, the power supplied from power supply is supplied to the micom, such that the micom is operated. A subsequent operation is as described above.

Meanwhile, although the MOSFET has been used as the elements each configuring the switch and the switch controller herein, a BJT may also be used as the elements each configuring the switch and the switch controller.

As described above, according to the present invention, an operation of the micro computer (micom) is stopped when the vehicle is stopped, thereby making it possible to minimize power consumption.

In addition, according to the present invention, electric power consumption is minimized, thereby making it possible to use the battery having a small capacity.

Further, according to the present invention, a light-weight battery is used, thereby making it possible to reduce a volume and a weight of the TPMS transmission module.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A TPMS transmission module having power saving function, the TPMS transmission module comprising:
   a micom transmitting a sensed tire state and outputting a switch turn-off control signal when a vehicle having the TPMS transmission module mounted therein is stopped;
   a switch supplying a power of a power supply to the micom when the switch is turned on and blocking the supply of the power to the micom when it is turned off;
   an energy generator generating and outputting an electric power when a wheel of the vehicle rotates, the wheel having the energy generator mounted thereon; and
   a switch controller turning on the switch when the electric power of a predetermined voltage or more is generated in the energy generator, maintaining the switch in a turn-on state when the micom is being operated, and turning off the switch when a switch turn off control signal is output from the micom.

2. The TPMS transmission module as set forth in claim 1, wherein the switch is a P-MOSFET having a source connected to the power supply, a drain connected to the micom, and a gate connected to the switch controller, and
   the switch controller turns on the P-MOSFET by applying the electric power of a predetermined voltage or more to the gate thereof when the electric power of a predetermined voltage or more is generated in the energy generator, maintains the P-MOSFET in a turn-on state when the micom is being operated, and turns off the P-MOSFET by applying the electric power of a predetermined voltage or less to the gate thereof when the switch turn off control signal is output from the micom.

3. The TPMS transmission module as set forth in claim 1, wherein the energy generator includes:
   a housing;
   a loading mass; and
   a piezoelectric element having a first end fixed to the housing and a second end coupled to the loading mass, and
   wherein the piezoelectric element and the loading mass coupled thereto are influenced by gravity when the wheel is rotating to thereby generate the electric power.

4. The TPMS transmission module as set forth in claim 1, wherein the switch controller includes:
   a first resistor connected between the power supply and the switch;
   an N-MOSFET having a drain connected to the switch and a source connected to a ground; and
   a second resistor connected between a gate of the N-MOSFET and the micom in series, and
   wherein the N-MOSFET turns on the switch when the electric power of a predetermined voltage or more is applied from the energy generator thereto, maintains the switch in a turn-on state when the micom is being operated, such that the electric power of a predetermined voltage or more is applied from the micom to the gate thereof through the second resistor, and turns off the switch when the vehicle having the TPMS transmission module mounted therein is stopped, such that the electric power of a predetermined voltage or less is applied from the micom to the gate thereof through the second resistor.

5. The TPMS transmission module as set forth in claim 4, wherein the sensor module includes:
   a pressure sensor sensing pressure; and
   a temperature sensor sensing temperature.

* * * * *